Dec. 10, 1968 N. S. FITTI, JR 3,415,994

DUAL ELEMENT INFRARED DETECTOR

Filed Oct. 28, 1966

INVENTOR.
NICHOLAS S. FITTI, JR.

BY [signature]
ATTORNEY

United States Patent Office 3,415,994
Patented Dec. 10, 1968

3,415,994
DUAL ELEMENT INFRARED DETECTOR
Nicholas S. Fitti, Jr., Perkasie, Pa., assignor to the United States of America as represented by the Secretary of the Navy
Filed Oct. 28, 1966, Ser. No. 591,054
14 Claims. (Cl. 250—83.3)

ABSTRACT OF THE DISCLOSURE

An axial arrangement for a large area and a small area infrared detector is described which provides an infrared system with both high resolution and high sensitivity. The field of view for the small area detector is provided by an aperture in the large area detector and by virtue of the unobstructed axial alignment, the respective detector sensitivities are unaffected by the presence of the other. Both detectors are housed in an integrated assembly which is positioned at the focal point of an optical system for detecting the radiation of a distant source.

Figure 1:
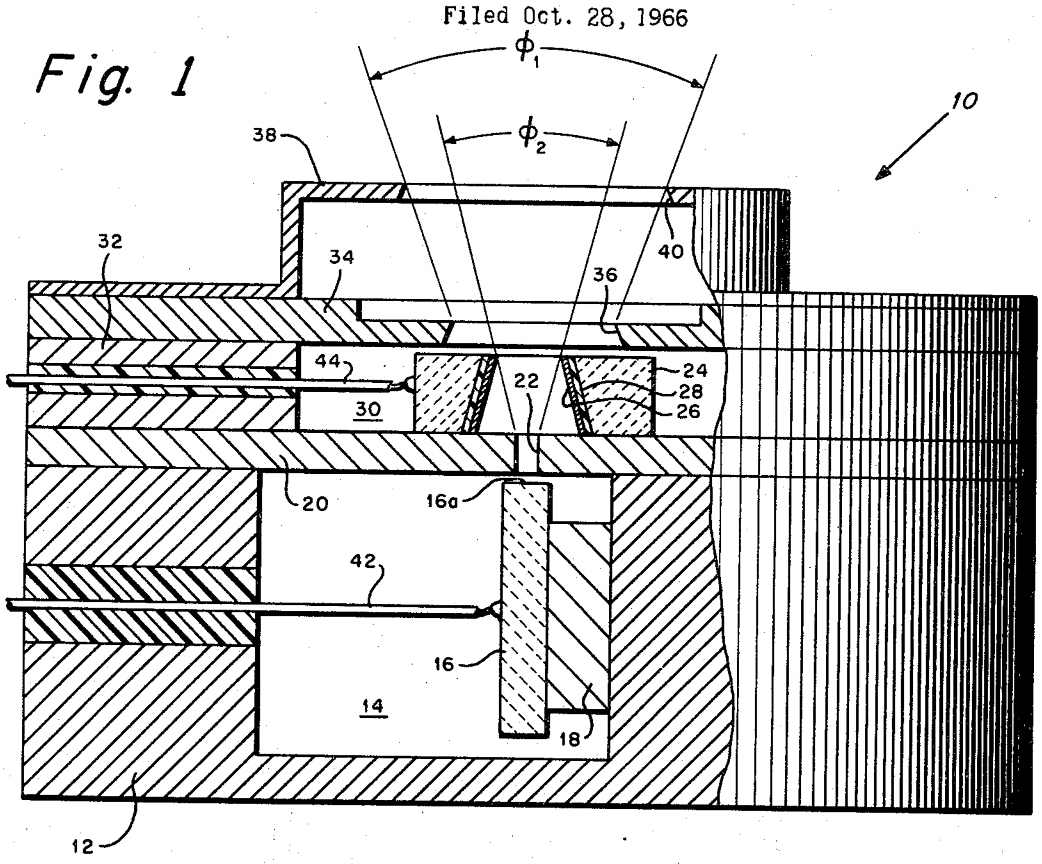

The invention described herein may be manufactured and used by or for the Government of the United States of America for governmental purposes without the payment of any royalties thereon or therefor.

The present invention relates generally to improvements in infrared detectors and the like and more particularly to a new and improved arrangement of infrared detectors wherein the maximum sensitivity consistent with a desired field of view is achieved for the detectors.

Throughout the infrared (IR) spectrum of 0.72 micron and 1000 microns, various types of IR detectors have been used for scientific, industrial and military applications. For example, in the near-IR region (.72 to 3.0 microns) of the spectrum, photoelectric, thalofide and lead sulfide cells have been used as detectors. In the middle-IR region (3.0 to 8.0 microns) photoconductive cells such as lead telluride, lead selenide and more recently doped germanium and silicon cells have been used. In the far-IR region (8.0 to 1000 microns) thermocouples, bolometers, thermopiles and doped germanium and silicon cells have been used. In the field of aerial reconnaissance and mapping, various arrangements and combinations of these detectors have been utilized in attempts to provide an IR system with both high resolution and high sensitivity characteristics. One such arrangement utilizes coplanar-mounted detector elements in which a large area detector is used to provide high sensitivity but low resolution characteristics and a small area detector to provide the high resolution characteristics. These detectors were placed behind a common field stop and by use of an optical focusing system were able to scan the topography of a particular area. Although this coplanar detector arrangement has served its purpose, it has not proved entirely satisfactory since the sensitivity of the smaller area infrared detector, in particular, is compromised in the following manner. The small area detector, being mounted alongside the large area detector, has its field of view (steradian or solid spherical angle) defined by the same field stop as the large area detector. Since the sensitivity of a background limited detector is inversely proportional to its field of view, a reduction in sensitivity in a small area detector results because of the increased field of view provided by the larger aperture required by the large area detector. This reduction in detector sensitivity is then reflected as a reduction in overall system sensitivity.

The present invention has overcome this problem by providing an arrangement for a small area and a large area detector such that maximum sensitivity can be obtained from both detectors without compromise. To attain this, the present invention contemplates a unique arrangement of both a large area detector and a small area detector in which the large area detector functions not only as a detector, but also as a field stop for the small area detector. The large area detector is annular shaped and is placed forward of the small area detector for restricting the field of view of the small area detector. The entire integrated package is then positioned in the focal plane of an IR optical system thereby providing the system with a dual capability of high resolution and high sensitivity.

It is, therefore, an object of the present invention to provide a new and improved arrangement of detectors in which each detector element exhibits maximum sensitivity consistent with the desired detector field of view and wherein a unique arrangement of detectors enables one detector to operate as a field stop for the other detector.

Another object is to provide a coaxial type configuration for two detector elements in which the detector sensitivity of each detector is maintained at as high a level as would be experienced if each detector were operated individually with its appropriate field stop.

Another object of the invention is to provide a concentric arrangement of detectors in which two different detector materials may be utilized to provide an infrared system with sensitivity in two separate spectral regions.

Figure 2:
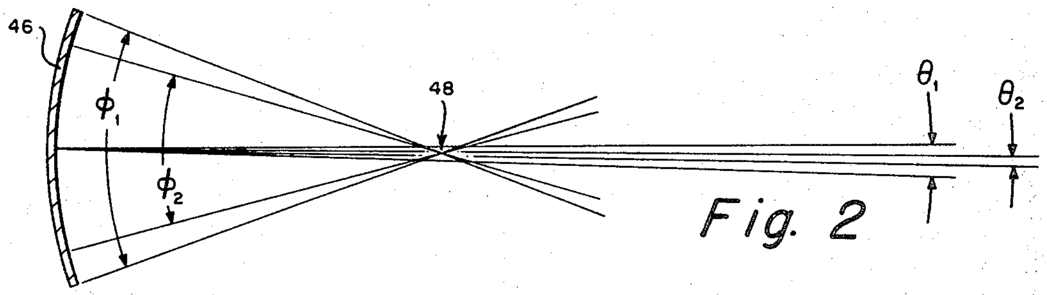

With these and other objects in view, as will hereinafter more fully appear, and which will be more particularly pointed out in the appended claims, reference is now made to the following description taken in connection with the accompanying drawing in which:

FIG. 1 illustrates a section of an embodiment of the invention showing the detectors, apertures and their relative positions; and FIG. 2 illustrates a typical optical arrangement utilizing the detectors of the present invention.

Referring now to the drawing, there is shown in FIG. 1 an embodiment of the invention in which an integrated detector package 10 comprises a cylindrical housing 12 for providing a common mounting base for related components. Within the housing is a chamber 14 which contains a small area IR detector 16. The detector element may be any of a variety of well known detectors provided it exhibits the desired sensitivity in the operating region of interest. For example, if it were desired to operate in the middle-IR region, a mercury doped germanium crystal may be employed.

The detector 16 is secured to the wall of the chamber 14 through a connecting block 18 which provides not only a psysical support and alignment for the detector 16, but also paths for thermal and electrical conduction, as will be described hereinafter. The surface 16*a* of the crystal 16 is placed directly behind an aperture plate 20 having an aperture 22 therein, which accepts incident radiation. This technique requires that the plate be placed as close as possible and in alignment with the small area crystal so that the aperture 22 properly defines the exposed area of the crystal. Obviously the function of the aperture plate 20 could also be provided by properly configuring the surface 16*a* to the necessary shape and area.

Contiguous with the aperture plate 20 and concentrically positioned ahead of the small area detector 16 is a large area detector 24. This detector, which may also be a doped germanium crystal, is annular-shaped with the inner diameter thereof being used as a field stop for establishing the field of view for the small area detector 16. The inner diameter of the aperture is governed by simple trigonometric functions relating the area of the small area detector 16, the spacing between the area defining aperture and the front surface of the large area detector and the desired field of view for detector 16. The inner diameter of the aperture is tapered to reduce radiation reflections from the side walls.

Since germanium type crystals are not entirely opaque to IR radiation, it is necessary to coat the walls of the center hole with a reflecting coating 26 which may be of a metallic material. A direct application or deposition of the metallic material on the crystal would electrically short-circuit the crystal, hence an insulating undercoat 28 is applied to the crystal before the reflective coating is deposited. Both the reflecting coating 26 and the insulating undercoat 28 may be selected from various materials known in the semiconductor art.

The crystal 24 is enclosed within a chamber 30 by an annular-shaped spacer 32 and a second area-defining aperture plate 34. An aperture 36 of aperture plate 34 defines the outside diameter of the large area detector 24. A field stop cap 38, also with a specific diameter aperture 40, is employed to establish the field of view for the large area detector 24. The dimension of aperture 40 is governed by simple trigonometric relationships as described with respect to the small area detector 16. The height of the spacer 32 is adjusted so that the aperture 36 is as close as possible to the surface of the exposed crystal element 24 so that the exposed area of the crystal is well defined. The walls of the aperture 40 are tapered for the same reasons that the walls of the large area detector are tapered. Connected to the crystal elements 16 and 24 are insulated signal leads 42 and 44 respectively, for providing a bias voltage to the crystals and for coupling signal information therefrom to signal amplifiers (not shown). A return path for the electrical signals is provided by the connection of the crystals to the detector housing.

To better understand how the concentric dual element detector provides both a high resolution and high sensitivity detector, reference is now made to FIG. 2 which illustrates a spherical mirror 46 having a focal point 48. Positioned at this focal point, but not shown, for purposes of clarity, is an integrated detector 10 as illustrated in FIG. 1 with the apertured end thereof directed toward the mirror 46. The spherical sector of the mirror 46 is designated and is shown, for purposes of illustration only, to be equal to the field of view for the large area detector.

As can be seen in FIG. 1, the field of view or steradian $\phi_1$ for the large area detector 24 is established by the field stop 38 and the area limiting aperture plate 34 and from simple trigonometric functions, the angle $\phi_1$ can be found to be equal to twice the arc tangent of the difference in radii between the aperture 40 and the aperture 36 divided by the vertical distance between the aperture 40 and the aperture 36. For purposes of illustration, consider the situation in which the diameter of aperture 40 is equal to 5 millimeters and the diameter of aperture 36 is equal to 3.2 millimeters and the distance between these two apertures is 2.47 millimeters. Then, $\phi_1$ would be equal to 2 arc tan 0.9/2.47 which is equal to 40°. In a similar manner the field of view $\phi_2$ for the small area detector could be calculated. It should be pointed out that, while the field of views for both detectors were calculated in this example by knowing the aperture dimensions, it would be possible to determine the aperture dimensions conforming to a desired field of view.

The conical shaped beams or steradians $\theta_1$ and $\theta_2$ illustrate the pencil-like beams which are attainable with an IR detector employed in an optical system. For example, if the diameter of the large area detector 24 were 3.2 millimeters and the focal length of the mirror 46 were 183 millimeters, then for small angles the steradian $\phi_1$ would be equal to arc tan 3.2/183 for 1.0°. In like manner, the steradian $\phi_2$ for the small area detector could also be calculated.

To utilize the concentric dual element detector described above to its fullest capability, it is necessary to provide an optical system which has a sufficient depth of field to enable both elements to be positioned within the focal plane of the system. Where the depth of the field is too restricted to accommodate both elements, it has been found that little degradation in system performance is experienced if the small area detector is located at the system focal plane with the large area detector forward of this point. The slight defocusing occasioned thereby has been found to have little noticeable effect on overall system capabilities.

Depending upon the particular type crystal detectors employed, it may be necessary to cryogenically cool the entire integrated assembly in order to provide the necessary low temperature of operation for optimum crystal performance. For example, a copper doped germanium crystal must be operated near 12° Kelvin whereas mercury doped germanium crystals need only be cooled to 25 to 30° Kelvin to provide a desirable operating condition. Accordingly, it is essential that the crystals are thermally connected to a heat sink; to this end, connecting block 18 and aperture plate 20 are thermally connected to the detector housing which is then connected to the heat sink. These low temperatures can be provided by various devices well known to those skilled in the art. For example, liquid helium filled dewars or miniaturized cryogenic refrigerators could be utilized to provide this low temperature for detector operation.

Obviously many modifications and variations of the present invention are possible in light of the above teachings. For example, differently doped crystals could be used to provide sensitivities in different parts of the IR spectrum. It is therefore to be understood that, within the scope of the appended claims, the invention may be practiced otherwise than as specifically described.

What is claimed is:

1. A dual element detecting device comprising:

optical means for receiving radiation and providing a focal plane;

first detecting means;

second detecting means;

said first detecting means having an aperture extending therethrough configured to provide a field stop for said second detector;

said second detector in registry with said aperture and positioned at said focal plane;

said first detector positioned forward of said focal plane;

wherein the exposed area of said second detector is less than that of said first detector, whereby said second detector provides a higher resolution than said first detector.

2. A dual element detector as recited in claim 1 further comprising:

means providing a field stop for said first detector for establishing the field of view thereof, whereby the respective sensitivities of said detectors is not degraded by their physical proximity.

3. A dual element detector as recited in claim 2 further comprising:

a housing member having a chamber, said second detector operatively connected within said chamber;

an apertured plate interposed between said detectors and secured to said housing member for defining the area of said second detector; and a second apertured plate spaced from the first plate and forming a chamber for said first detector, said aperture defining the area of said first detector.

4. A dual element detector as recited in claim 3 wherein said means providing a field stop comprises:

a cap secured to said second apertured plate and having an aperture therein for defining the field of view of said first detector.

5. A dual element detector as recited in claim 4 wherein the detectors and the apertures in said plates are concentrically positioned within said housing member.

6. A dual element detector as recited in claim 5 wherein said first detector further comprises:

an insulating material bonded to the walls of said aperture; and a reflecting material bonded to said insulating material for preventing radiation entering said first detector from being detected by said second detector.

7. A dual element detector as recited in claim 6 wherein the walls of said first detector are tapered to reduce radiation reflections of the side walls from said second detector.

8. A dual element detector as recited in claim 7 wherein said first and second detectors have sensitivities in different spectral regions.

9. A dual element detecting device for detecting infrared radiation, said device comprising:

a housing member having a chamber therein;

a first detector positioned within said chamber, said detector having at least one surface area adapted to be exposed to radiation;

a second detector positioned forward of said first detector and having an aperture extending therethrough configured to define the field of view of said first detector, whereby radiation within said field of view is permitted to impinge on the exposed surface area of said first detector;

wherein said first and second detectors are concentrically positioned within said housing and the field of view of said first detector is proportional to the size of said aperture and the distance between said detectors;

wherein the exposed surface area of said second detector is greater than that of said first detector, whereby the sensitivity of said second detector is greater than that of said first detector.

10. A device as recited in claim 9 wherein said detectors have sensitivities in different spectral regions.

11. A device as recited in claim 9 further comprising: means contiguous with the wall of said aperture for making said wall opaque to radiation.

12. A device as recited in claim 9 futher comprising: a first apertured plate secured to said housing, said first detector positioned adjacent the aperture in said plate for defining the exposed surface area thereof.

13. A device as recited in claim 12 further comprising: a second apertured plate secured to said housing and forward of said second detector for defining the exposed surface area thereof.

14. A device as recited in claim 13 further comprising: a field stop cap adjacent said second apertured plate and having an aperature therein for defining the field of view of said second detector.

References Cited

UNITED STATES PATENTS

| | | | |
|---|---|---|---|
| 3,076,949 | 2/1963 | Anderson | 338—18 |
| 3,255,351 | 6/1966 | Walsh et al. | 250—83 |

RALPH G. NILSON, *Primary Examiner.*

M. J. FROME, *Assistant Examiner.*

U.S. Cl. X.R.

250—83; 73—355; 338—18